(12) United States Patent
Datar et al.

(10) Patent No.: US 12,130,845 B2
(45) Date of Patent: Oct. 29, 2024

(54) METHOD AND SYSTEM FOR VALIDATION OF CALCULATION CODE AGAINST CALCULATION SPECIFICATION

(71) Applicant: Tata Consultancy Services Limited, Mumbai (IN)

(72) Inventors: Advaita Abhijit Datar, Pune (IN); Amey Zare, Pune (IN); Asia Akhtar, Hyderabad (IN); Venkatesh Ramanathan, Pune (IN); Shrawan Kumar, Pune (IN); Ulka Aniruddha Shrotri, Pune (IN); Suresh Bhaskaramurthy, Chennai (IN); Punyakoti Sathish, Chennai (IN); Kannan Dhanasekaran, Chennai (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 31 days.

(21) Appl. No.: 18/153,192

(22) Filed: Jan. 11, 2023

(65) Prior Publication Data

US 2023/0237078 A1    Jul. 27, 2023

(30) Foreign Application Priority Data

Jan. 27, 2022   (IN) .............................. 202221004590

(51) Int. Cl.
  *G06F 16/28* (2019.01)
  *G06F 40/18* (2020.01)
(52) U.S. Cl.
  CPC ............ *G06F 16/288* (2019.01); *G06F 40/18* (2020.01)

(58) Field of Classification Search
  None
  See application file for complete search history.

(56) References Cited

U.S. PATENT DOCUMENTS 5,461,708 A  * 10/1995 Kahn .................... G06F 40/18
                                                         345/440
7,689,494 B2    3/2010 Torre et al.
(Continued)

OTHER PUBLICATIONS

American Academy of Actuaries, "Model Risk Management", Title of the item: Report, Date: May 2019, Publisher: Deloitte, https://www2.deloitte.com/content/dam/Deloitte/f/Documents/risk/deloitte_model-risk-management_plaquette.pdf.
(Continued)

*Primary Examiner* — Augustine K. Obisesan
(74) *Attorney, Agent, or Firm* — FINNEGAN, HENDERSON, FARABOW, GARRETT & DUNNER, LLP (57) ABSTRACT

The present invention generally relates to the field of automated functional testing, and, more particularly, to a method and system for validation of calculation code against calculation specification. Currently the validation is done manually which is time consuming and effort intensive. Embodiments of present disclosure provide an automated method of validation by generating a schema from the calculation specification, retrieving data based on the schema, executing the intermediate calculations, and comparing the result with the output from the calculation code. The method requires minimal manual input and is a fast, simple, resilient and low-code/no-code technique that can be extended to support any type of calculation code and calculation specifications with minimal or no change.

3 Claims, 3 Drawing Sheets

(56) References Cited

U.S. PATENT DOCUMENTS

| | | | |
|---|---|---|---|
| 8,224,672 B1 | 7/2012 | Griffith | |
| 9,037,961 B1* | 5/2015 | Mansell | G06F 40/18 |
| | | | 715/212 |
| 11,714,796 B1* | 8/2023 | Srivastava | G06F 40/18 |
| | | | 707/769 |
| 2009/0019350 A1* | 1/2009 | Wei | G06F 40/18 |
| | | | 715/219 |
| 2009/0113284 A1* | 4/2009 | Kulkarni | G06F 40/18 |
| | | | 715/219 |
| 2011/0276870 A1* | 11/2011 | Kulkarni | G06F 40/18 |
| | | | 715/219 |
| 2012/0137204 A1* | 5/2012 | Petrovicky | G06F 40/18 |
| | | | 715/219 |
| 2013/0013994 A1* | 1/2013 | Handsaker | G06F 40/18 |
| | | | 715/219 |
| 2015/0317297 A1* | 11/2015 | Chandrasekaran | G06F 16/22 |
| | | | 715/212 |

OTHER PUBLICATIONS

Institute for Social Science Research, the University of Queensland Deloitte Actuaries and Consulting Limited, "Validation of the Actuarial Valuation for the Australian Priority Investment Approach to Welfare" Title of the item: Report, Date: Nov. 2016, Publisher: The University of Queensland, https://www.dss.gov.au/sites/default/files/documents/12_2017/validation_of_baseline_valuation.pdf.

* cited by examiner

METHOD AND SYSTEM FOR VALIDATION OF CALCULATION CODE AGAINST CALCULATION SPECIFICATION

This U.S. patent application claims priority under 35 U.S.C. § 119 to: Indian Patent Application No. 202221004590, filed on Jan. 27, 2022. The entire contents of the aforementioned application are incorporated herein by reference.

TECHNICAL FIELD

The disclosure herein generally relates to the field of automated functional testing, and, more particularly, to a method and system for validation of calculation code against calculation specification.

BACKGROUND

Insurers have multiple legacy Policy Administration Systems (PAS) and thousands of legacy products or variants, and processes built over decades limiting the ability of the PAS to be agile and nimble in this digital era. However, insurers dread to transform legacy PAS as they are highly complex and pose significant risk in terms of time, quality, and budget. An expert team is expected to understand the legacy PAS and prepare Calculation Specifications (CS) written in the form of workbooks having multiple spreadsheets known as CS sheets. These calculations represent the legacy system which needs to be validated against a new transformed PAS.

Currently, the validation process is manual. A Quality Assurance (QA) team is expected to get required inputs for the calculations from various sources like PAS transformed application, database, and configuration files. An output generated by the calculation specification is validated against the new transformed PAS. Such a manual QA approach is tedious, effort-intensive and a big challenge, especially in real-world scenarios when millions of policies need to be validated against thousands of calculation specifications. Attempts have been made to automate the validation process by developing software scripts corresponding to the calculation specifications and testing the software scripts. However, this process involves an additional effort-intensive task of developing software scripts. Although these scripts can handle a specific calculation specification, they need to be re-written for new calculation specifications.

SUMMARY

Embodiments of the present disclosure present technological improvements as solutions to one or more of the above-mentioned technical problems recognized by the inventors in conventional systems. For example, in one embodiment, a method for validation of calculation code against calculation specification is provided. The method includes receiving a calculation specification comprising one or more input fields, one or more output fields, and a plurality of intermediate calculations. The calculation specification is a workbook with one or more spreadsheets linking the one or more input fields and the one or more output fields. Further the method includes generating a schema from the calculation specification by parsing each of the one or more spreadsheets and retrieving data related to the one or more input fields from data source mentioned in the schema and data related to the one or more output fields from a calculation code. The method further includes executing the plurality of intermediate calculations based on the data related to the one or more input fields to get calculated values of the one or more output fields. Furthermore, the method includes comparing the calculated values of the one or more output fields with the retrieved data related to the one or more output fields to validate calculation code against the calculation specification and displaying result of comparison for each of the one or more output fields as one of: (i) 'pass' if the calculated value of an output field among the one or more output fields is equal to retrieved data related to the output field and (ii) 'fail' if the calculated value of an output field among the one or more output fields is not equal to retrieved data related to the output field and highlighting the output field in the calculation specification to assist in debugging the calculation code.

In another aspect, a system for validation of calculation code against calculation specification is provided. The system includes: a memory storing instructions; one or more communication interfaces; and one or more hardware processors coupled to the memory via the one or more communication interfaces, wherein the one or more hardware processors are configured by the instructions to: receive a calculation specification comprising one or more input fields, one or more output fields, and a plurality of intermediate calculations. The calculation specification is a workbook with one or more spreadsheets linking the one or more input fields and the one or more output fields. Further the one or more hardware processors are configured to generate a schema from the calculation specification by parsing each of the one or more spreadsheets and retrieving data related to the one or more input fields from data source mentioned in the schema and data related to the one or more output fields from a calculation code. The one or more hardware processors are further configured to execute the plurality of intermediate calculations based on the data related to the one or more input fields to get calculated values of the one or more output fields. Furthermore, the one or more hardware processors are configured to compare the calculated values of the one or more output fields with the retrieved data related to the one or more output fields to validate calculation code against the calculation specification and display result of comparison for each of the one or more output fields as one of: (i) 'pass' if the calculated value of an output field among the one or more output fields is equal to retrieved data related to the output field and (ii) 'fail' if the calculated value of an output field among the one or more output fields is not equal to retrieved data related to the output field and highlighting the output field in the calculation specification to assist in debugging the calculation code.

In yet another aspect, there are provided one or more non-transitory machine-readable information storage mediums comprising one or more instructions which when executed by one or more hardware processors cause a method for validation of calculation code against calculation specification. The method includes receiving a calculation specification comprising one or more input fields, one or more output fields, and a plurality of intermediate calculations. The calculation specification is a workbook with one or more spreadsheets linking the one or more input fields and the one or more output fields. Further the method includes generating a schema from the calculation specification by parsing each of the one or more spreadsheets and retrieving data related to the one or more input fields from data source mentioned in the schema and data related to the one or more output fields from a calculation code. The method further includes executing the plurality of intermediate calculations based on the data related to the one or more input fields to get calculated values of the one or more output fields. Furthermore, the method includes comparing the calculated values of the one or more output fields with the retrieved data related to the one or more output fields to validate calculation code against the calculation specification and displaying result of comparison for each of the one or more output fields as one of: (i) 'pass' if the calculated value of an output field among the one or more output fields is equal to retrieved data related to the output field and (ii) 'fail' if the calculated value of an output field among the one or more output fields is not equal to retrieved data related to the output field and highlighting the output field in the calculation specification to assist in debugging the calculation code.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Transforming legacy insurance or banking applications involves validating results obtained by new systems against calculation specifications corresponding to legacy applications. Currently it is performed manually which is a time-consuming process and is also dependent on domain experts. Automated approaches require generating scripts for the calculation specifications which is an additional effort-intensive task. Unlike the existing approaches, embodiments of present disclosure utilize the already available calculation specifications as it is for validating against the calculation code of the transformed PAS application. Although the method has been applied on calculations in the PAS, it can be used for validating any other types of calculation code given the calculation specification with minimal or no changes. Initially, the calculation specification with input fields, output fields and intermediate calculations is received as input. The calculation specification is a workbook having multiple spreadsheets linking the input and output fields. Then, a schema is generated by parsing each spreadsheet. Data related to the input fields is retrieved from data source mentioned in the schema and data related to the output fields is retrieved from a calculation code. Further, the intermediate calculations are executed to obtain calculated values of the output fields which are then compared with the retrieved data of the output fields. Results of comparison is displayed to a user as pass or fail to assist in debugging the calculation code. Thus, the method disclosed herein automatically tests and validates results obtained by the calculation code of new systems (for example, PAS) against the calculation specifications of legacy systems in a short time. While manual validations need to be done for a single transaction at a time in conventional approaches, the disclosed method can execute multiple test cases corresponding to multiple transactions in parallel thereby reducing time taken for validation. Since calculation specifications are used as it is, the method can be applied for any banking or insurance applications or any other type of calculation software without any changes. Thus, the method is efficient and scalable.

Figure 1:
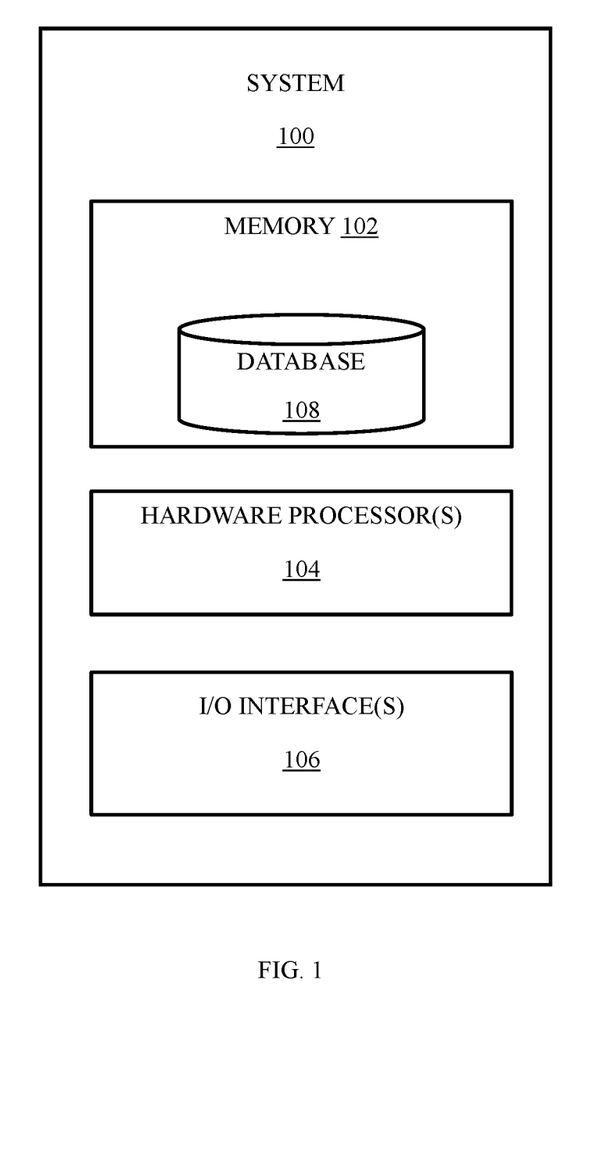
FIG. 1 illustrates an exemplary block diagram of a system for validation of calculation code against calculation specification, according to some embodiments of the present disclosure.
Figure 2:
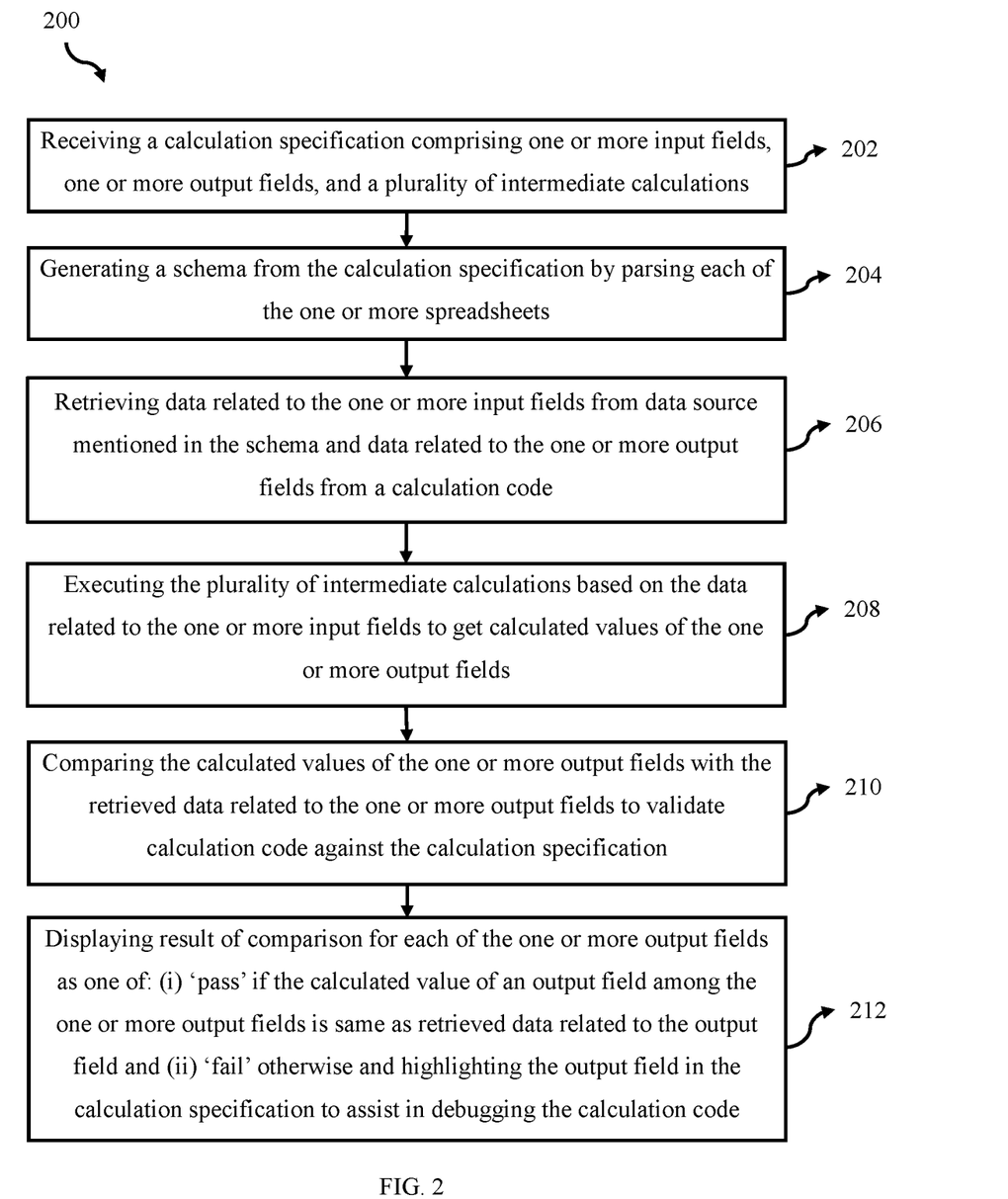
FIG. 2 is a flow diagram illustrating a method for validation of calculation code against calculation specification, according to some embodiments of the present disclosure.
Figure 3:
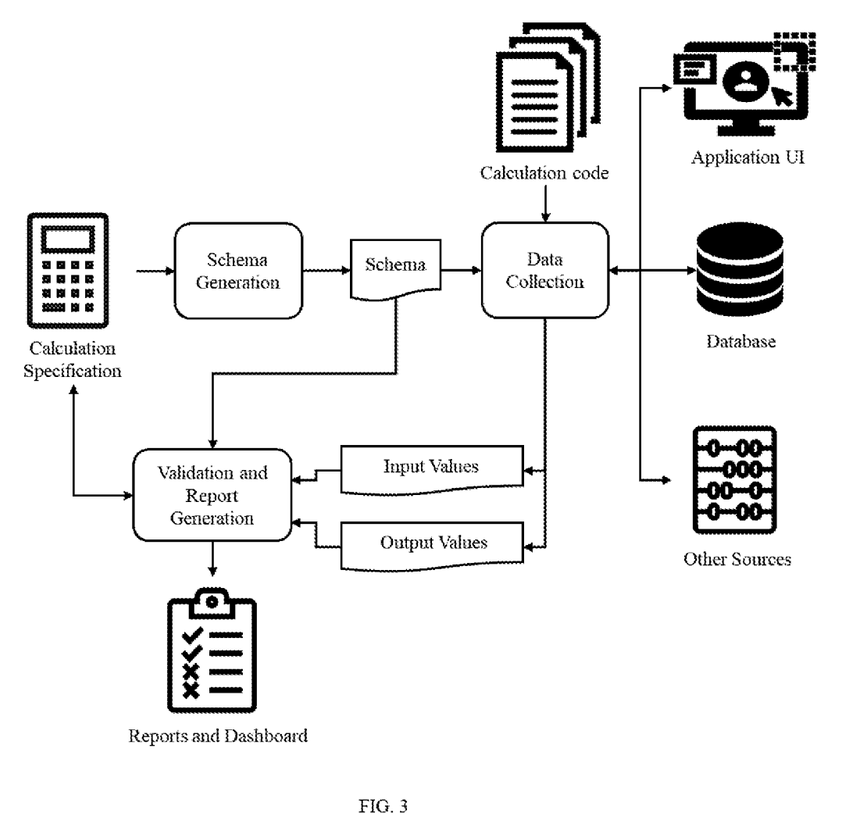
FIG. 3 is a functional block diagram of the method illustrated in FIG. 2, according to some embodiments of the present disclosure.

Referring now to the drawings, and more particularly to FIGS. 1 to 3, where similar reference characters denote corresponding features consistently throughout the figures, there are shown preferred embodiments and these embodiments are described in the context of the following exemplary system and/or method.

FIG. 1 illustrates an exemplary block diagram of a system for validation of calculation code against calculation specification, according to some embodiments of the present disclosure. In an embodiment, the system 100 includes one or more processors 104, communication interface device(s) 106 or Input/Output (1/O) interface(s) 106 or user interface 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like. The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) 106 receives a calculation specification as input and gives results of validation as output.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The database 108 may store information but not limited to information associated with at least one of: calculation specification, data values for input and output fields and so on. Further, the database 108 stores information pertaining to inputs fed to the system 100 and/or outputs generated by the system (e.g., at each stage), specific to the methodology described herein. Functions of the components of system 100 are explained in conjunction with flow diagram depicted in FIG. 2 and functional block diagram illustrated in FIG. 3 for validation of calculation code against calculation specification.

In an embodiment, the system 100 comprises one or more data storage devices or the memory 102 operatively coupled to the processor(s) 104 and is configured to store instructions for execution of steps of a method 200 depicted in FIG. 2 by the processor(s) or one or more hardware processors 104. The steps of the method of the present disclosure will now be explained with reference to the components or blocks of the system 100 as depicted in FIG. 1, the steps of flow diagram as depicted in FIG. 2 and the functional block diagram illustrated in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIG. 2 is a flow diagram illustrating the method 200 for validation of calculation code against calculation specification, according to some embodiments of the present disclosure and FIG. 3 is an architectural overview of the system 100 executing the method 200 of FIG. 2. At step 202 of the method 200, the one or more hardware processors 104 are configured to receive a calculation specification comprising one or more input fields, one or more output fields, and a plurality of intermediate calculations. The calculation specification is a workbook with one or more spreadsheets linking the one or more input fields and the one or more output fields. The calculation specification also mentions a source from which the input fields need to be obtained. In another embodiment, a plurality of calculation specifications are received as input and method 200 is performed on each of the plurality of calculation specifications to validate the calculation code corresponding to the plurality of calculation specifications.

Once the calculation specification is received, at step 204 of the method 200, the one or more hardware processors 104 are configured to generate a schema from the calculation specification by parsing each of the one or more spreadsheets. Initially, a directed graph is constructed from the calculation specification. It comprises of a plurality of nodes corresponding to each of a plurality of cells in the one or more spreadsheets and a plurality of directed edges connecting each pair of nodes among the plurality of nodes which represent relation between the corresponding cells. In order to construct the direct graph, firstly contents of all the cells in the one or more spreadsheets are read and the cells that are not empty are identified. Then, formula corresponding to the non-empty cells are parsed to identify referred cells. For example, suppose a cell having ID H3 has a formula '=H10−B3−H11', then, the cells H10, B3 and H11 are identified as referred cells for cell H3. In case a cell in a first spreadsheet has referred cells belonging to a second spreadsheet among the one or more spreadsheets, then the second spreadsheet is tagged as referred sheet for the first spreadsheet. Once the referred cells and referred sheets are identified, a plurality of nodes corresponding to each of the plurality of cells are constructed. Each cell (e.g. H3) is tagged as source node and an edge is drawn to each of its referred cells (H110, B3, H11) by tagging them as destination nodes.

Once the graph is constructed, each of the plurality of nodes are classified as one of: (i) input field if the node has no incoming edge and one or more outgoing edges, (ii) output field if the node has one or more incoming edges and no outgoing edge, and (iii) intermediate calculation if the node has one or more incoming edges and one or more outgoing edges. In other words, input fields are the nodes that are never tagged as a 'source node' but are tagged as 'destination node' at least once. Output fields are the nodes that are never tagged as a 'destination node' but are tagged as 'source node' at least once. After the plurality of nodes are classified, data source of each of the plurality of nodes are identified from the calculation specification. The data source is one of: a database and an Application User Interface (App UI). Further, the schema is generated as a Comma Separated Value (CSV) file comprising a plurality of entries corresponding to the plurality of nodes. Each of the plurality of entries comprise: (i) type of field which is one of: an input field and an output field, (ii) cell ID of the field, (iii) data source of the field which is one of: a database and an Application User Interface (App UI), and (iv) a data type of value of the field (for example, int, string etc.). The schema is a lightweight alternative to the calculation specification as it contains textual facts about the calculation specification and omits complex spreadsheet features and formulae. Schema generalizes the structure of calculation specifications and as a result domain experts can write parameterized data collection scripts that gives method 200 the flexibility to validate multiple calculation specifications with no or minimal changes in the implementation of the method 200.

Once the schema is generated, at step 206 of the method 200, the one or more hardware processors 104 are configured to retrieve data related to the one or more input fields from the data source mentioned in the schema and data related to the one or more output fields from a calculation code. Selenium scripts are used to retrieve data from App UI and Python scripts are used to retrieve data from the database. These data collection scripts are designed to collect data for any given calculation specification based on parameters like UI screen name, field name, database queries etc. which are provided by domain experts for each calculation specification. Collection and execution of input and output values based on such parameterized information makes the method 200 a low-code/no-code test automation technique.

Therefore, to validate a different input calculation specification, the method 200 only needs the parameterized information for collecting data. Once all the input-output values are retrieved, at step 208 of the method 200, the plurality of intermediate calculations are executed by the one or more hardware processors 104 based on the data related to the one or more input fields to obtain calculated values of the one or more output fields. Further, at step 210, one or more hardware processors are configured to compare the calculated values of the one or more output fields with the retrieved data related to the one or more output fields to validate calculation code against the calculation specification. The result of comparison are then displayed for each of the one or more output fields as one of: (i) 'pass' if the calculated value of an output field among the one or more output fields is equal to retrieved data related to the output field and (ii) 'fail' otherwise. If the result is 'fail', the corresponding output field in the calculation specification is highlighted to assist in debugging the calculation code.

Use Case Example

As a use case example, the method 200 is applied to validate a calculation code for calculating simple interest. The corresponding calculation specification is given in Table 1.

TABLE 1

| Parameter | Value | Source |
|---|---|---|
| Inputs | | |
| Principal amount | 10000 | App UI |
| Time period | 1 | App UI |
| Rate of interest | 5% | Table Value |
| Outputs | | |
| SI_Amount | 10,500.00 | App UI |
| Intermediate Steps | | |
| SI | 500.00 | |

In Table 1, the input fields are principal amount, time period and rate of interest. Output field (SI_Amount) is an amount obtained after applying simple interest on the input fields. Intermediate steps indicate intermediate results of calculations performed to obtain the output. As understood by a person skilled in the art, the simple interest is calculated as (principal*time*rate of interest)/100. The interest obtained (SI) is specified under intermediate steps field. The calculation specification also specifies the source from which the parameters must be extracted. In the example illustrated in Table 1, App UI means that the parameters can be obtained from user interface of the calculation code (alternatively referred as calculation application) and table value indicates that the parameters are stored in a table in the database 108. Table 2 illustrates the schema corresponding to the calculation specification of Table 1 generated at step 204 of the method 200. Table 3 gives the data retrieved at step 206 using the schema.

TABLE 2

| Interest_CS.xlsx Principal | Amount Time | Rate | ~ | SI_Amount |
|---|---|---|---|---|
| C3 | C4 | C5 | ~ | C9 |
| App UI | App UI | Database | ~ | App UI |

TABLE 3

| Interest_CS.xlsx S. No | Amount Field Name | Input/Output | Value |
|---|---|---|---|
| 1 | Principal | Input | 10000 |
| 2 | Time | Input | 1 |
| 3 | Rate | Input | 0.05 |
| 4 | SI_Amount | Output | 10500 |

In an embodiment, there may be multiple test cases having different values of input and output. All such test cases are merged into a single file as given in table 4.

TABLE 4

| CS_NAME Test Case No. | Interest_CS.xlsx Principal | Amount Time | Rate | ~ | SI_Amount |
|---|---|---|---|---|---|
| 0 | C3 | C4 | C5 | ~ | C9 |
|   | App UI | App UI | Database | ~ | App UI |
| AZ21091988 | 10000 | 1 | 0.05 | ~ | 10500 |
| CJ20021961 | 5000 | 5 | 0.1 | ~ | 7500 |
| MR01091990 | 7500 | 4 | 0.12 | ~ | 11000 |

Steps 208 to 212 of the method 200 are performed and the final result displayed is given in table 5. In addition, for failed scenarios, a copy of the calculation specification with highlighted output fields are given as output.

TABLE 5

| Test case no. | Result |
|---|---|
| AZ21091988 | PASS |
| CJ20021961 | FAIL |
| MR01091990 | FAIL |

Experimental Results

The method 200 is evaluated by a QA team that was handling a digital transformation project for a large insurance company. The QA team used the method 200 to validate the insurance company's Policy Administration System (PAS) against 12 calculation specifications through 254 real-world insurance policies. These 12 calculation specifications belong to the categories described in Table 6. The experiments are conducted on i7-8565U CPU @1.80 GHz with 16 GB RAM and Microsoft Windows 10 Pro OS. The objectives of the experiments are a) calculating effort savings through one-to-one comparison with manual approach, and b) measuring performance of the method 200 in batch-mode execution.

TABLE 6

| | Category | | |
|---|---|---|---|
| Attribute of calculation specification | Easy | Medium | Hard |
| Number of dependent spreadsheets | 0 | 4 | 6 |
| Number of input fields | <8 | 8-15 | >15 |
| Any advance features? | No | No | Tabular data, config tables, etc. |

A. Comparison with Manual Approach for Single Policy

To evaluate the efforts saved through method 200, the efforts spent by a tester for end-to-end manual validation of a single insurance policy are compared against the time taken by the method 200 to do the same. End-to-end validation comprises of collecting input & output values from respective data source(s) of PAS, filling input values in the Calculation Specification (CS) sheet and comparing the output values generated by CS sheet with output values collected from PAS. Table 7 shows the results of one-to-one comparison of method 200 against manual validation approach. In this experiment, the method 200 outperformed manual approach with an average effort savings of approximately 92%. It is worth noting that the efforts shown in table 7 do not include the efforts spent by domain experts to provide CS-specific parameters, such as screen name, database query etc., for data collection scripts. This is because both manual approach and method 200 depend on the said CS-specific input parameters for end-to-end validation.

TABLE 7

| Calculation specification | Time (sec) | | | Total efforts (min) | | Effort savings (%) |
|---|---|---|---|---|---|---|
| | Step 204 | Step 206 | Steps 208 to 212 | Method 200 | Manual approach | |
| Easy-1 | 1.3 | 157 | 4.5 | 2.71 | 20 | 86.43 |
| Easy-2 | 3 | 110 | 17 | 2.17 | 20 | 89.17 |
| Easy-3 | 3 | 123 | 14 | 2.33 | 25 | 90.67 |
| Medium-1 | 3.3 | 129 | 13.6 | 2.43 | 30 | 91.89 |
| Medium-2 | 2.2 | 143 | 7.9 | 2.55 | 30 | 91.49 |
| Medium-3 | 1.8 | 185 | 12.08 | 3.31 | 40 | 91.71 |
| Medium-4 | 3 | 180 | 15 | 3.3 | 40 | 91.75 |
| Medium-5 | 3 | 160 | 14 | 2.95 | 40 | 92.63 |
| Medium-6 | 3 | 170 | 16 | 3.15 | 40 | 92.13 |
| Hard-1 | 2.8 | 210 | 9.3 | 3.67 | 60 | 93.83 |
| Hard-2 | 3 | 268 | 12.42 | 4.72 | 70 | 93.25 |
| Hard-3 | 3.3 | 283 | 15.6 | 5.03 | 75 | 93.29 |

B. Batch-Mode Execution for Multiple Policies

To ensure that the method 200 is robust and scales on bulk real world data, 254 insurance policies relevant to Easy-3 and Medium-3 calculation specifications are validated end-to-end. These two calculation specifications are picked because they are representative of the common types of calculation specifications and also have maximum number of actual policies readily available. Table 8 shows observations from the batch-mode execution of method 200 and comparison of system efforts with projected efforts in case a tester manually validates the same number of policies. In this experiment, the method 200 is able to scale-up on the real-world policies with effort savings of approximately 91%. It is to be noted that execution time of method 200 (column 'system effort') shows the time taken for data collection, validation and report generation only, as schema generation is effectively a one-time activity for execution of each calculation specification in batch mode. The indicated manual effort is a ballpark estimate. It has been extrapolated by multiplying number of policies with the average manual effort spent by a tester to validate a single policy for respective calculation specification category.

TABLE 8

| Calculation specification | No. of policies | System effort (in minutes) | Manual (in minutes) | | Effort savings (%) |
|---|---|---|---|---|---|
| | | | Per policy | Total effort | |
| Easy-3 | 171 | 360 | 25 | 4275 | 91.58 |
| Medium-3 | 83 | 350 | 40 | 3320 | 89.46 |

As evident from tables 7 and 8, the method 200 is very effective in automatically validating implementation (code) of calculations against their specifications through bulk real-world data. It is also very efficient and, on an average, results in approximately 92% effort savings when compared to existing manual validation approach. Furthermore, the inconsistencies reported by the method 200 for the 12 calculation specifications under test matched the ones reported through manual validation. This makes the method 200 a robust and reliable approach for QA of PAS. Based on the results of conducted experiment, the insurance company estimates that use of the method 200 in all their projects will lead to effort savings of 100 person years and cost savings of US $10 million.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    receiving, via one or more hardware processors, a calculation specification comprising one or more input fields, one or more output fields, and a plurality of intermediate calculations, wherein the calculation specification is a workbook with one or more spreadsheets linking the one or more input fields and the one or more output fields;
    generating, via the one or more hardware processors, a schema from the calculation specification by parsing each of the one or more spreadsheets, wherein the generation of the schema further comprises:
        constructing a directed graph comprising a plurality of nodes corresponding to each of a plurality of cells in the one or more spreadsheets and a plurality of directed edges connecting each pair of nodes among the plurality of nodes which represent relation between the corresponding cells;
        classifying each of the plurality of nodes as: (i) input field if the node has no incoming edge and one or more outgoing edges, (ii) output field if the node has one or more incoming edges and no outgoing edge, and (iii) intermediate calculation if the node has one or more incoming edges and one or more outgoing edges;
        identifying data source of each of the plurality of nodes from the calculation specification; and
        generating the schema as a Comma Separated Value (CSV) file comprising a plurality of entries corresponding to the plurality of nodes, wherein each of the plurality of entries comprise: (i) type of field which is one of: an input field and an output field, (ii) cell identifier (ID) of the field, (iii) data source of the field which is one of: a database and an Application User Interface (App UI), and (iv) a data type of value of the field;
    retrieving, via the one or more hardware processors, data related to the one or more input fields from data source mentioned in the schema and data related to the one or more output fields from a calculation code;
    executing, via the one or more hardware processors, the plurality of intermediate calculations based on the data related to the one or more input fields to obtain calculated values of the one or more output fields;
    comparing, via the one or more hardware processors, the calculated values of the one or more output fields with the retrieved data related to the one or more output fields to validate calculation code against the calculation specification; and
    displaying, via the one or more hardware processors, result of comparison for each of the one or more output fields as one of: (i) 'pass' if the calculated value of an output field among the one or more output fields is equal to retrieved data related to the output field and (ii) 'fail' if the calculated value of an output field among the one or more output fields is not equal to retrieved data related to the output field and highlighting the output field in the calculation specification to assist in debugging the calculation code.

2. A system, comprising:
    a memory storing instructions;
    one or more communication interfaces; and
    one or more hardware processors coupled to the memory via the one or more communication interfaces, wherein the one or more hardware processors are configured by the instructions to:
        receive a calculation specification comprising one or more input fields, one or more output fields, and a plurality of intermediate calculations, wherein the calculation specification is a workbook with one or more spreadsheets linking the one or more input fields and the one or more output fields;
        generate a schema from the calculation specification by parsing each of the one or more spreadsheets, wherein the generation of the schema further comprises:
            constructing a directed graph comprising a plurality of nodes corresponding to each of a plurality of cells in the one or more spreadsheets and a plurality of directed edges connecting each pair of nodes among the plurality of nodes which represent relation between the corresponding cells;
            classifying each of the plurality of nodes as: (i) input field if the node has no incoming edge and one or more outgoing edges, (ii) output field if the node has one or more incoming edges and no outgoing edge, and (iii) intermediate calculation if the node has one or more incoming edges and one or more outgoing edges;
            identifying data source of each of the plurality of nodes from the calculation specification; and
            generating the schema as a Comma Separated Value (CSV) file comprising a plurality of entries corresponding to the plurality of nodes, wherein each of the plurality of entries comprise: (i) type of field which is one of: an input field and an output field, (ii) cell identifier (ID) of the field, (iii) data source of the field which is one of: a database and an Application User Interface (App UI), and (iv) a data type of value of the field;
        retrieve data related to the one or more input fields from data source mentioned in the schema and data related to the one or more output fields from a calculation code;
        execute the plurality of intermediate calculations based on the data related to the one or more input fields to obtain calculated values of the one or more output fields;
        compare the calculated values of the one or more output fields with the retrieved data related to the one or more output fields to validate calculation code against the calculation specification; and display result of comparison for each of the one or more output fields as one of: (i) 'pass' if the calculated value of an output field among the one or more output fields is equal to retrieved data related to the output field and (ii) 'fail' if the calculated value of an output field among the one or more output fields is not equal to retrieved data related to the output field and highlighting the output field in the calculation specification to assist in debugging the calculation code.

3. One or more non-transitory machine-readable information storage mediums comprising one or more instructions which when executed by one or more hardware processors cause:

receiving a calculation specification comprising one or more input fields, one or more output fields, and a plurality of intermediate calculations, wherein the calculation specification is a workbook with one or more spreadsheets linking the one or more input fields and the one or more output fields;

generating a schema from the calculation specification by parsing each of the one or more spreadsheets, wherein the generation of the schema further comprises:

constructing a directed graph comprising a plurality of nodes corresponding to each of a plurality of cells in the one or more spreadsheets and a plurality of directed edges connecting each pair of nodes among the plurality of nodes which represent relation between the corresponding cells;

classifying each of the plurality of nodes as: (i) input field if the node has no incoming edge and one or more outgoing edges, (ii) output field if the node has one or more incoming edges and no outgoing edge, and (iii) intermediate calculation if the node has one or more incoming edges and one or more outgoing edges;

identifying data source of each of the plurality of nodes from the calculation specification; and generating the schema as a Comma Separated Value (CSV) file comprising a plurality of entries corresponding to the plurality of nodes, wherein each of the plurality of entries comprise: (i) type of field which is one of: an input field and an output field, (ii) cell identifier (ID) of the field, (iii) data source of the field which is one of: a database and an Application User Interface (App UI), and (iv) a data type of value of the field;

retrieving data related to the one or more input fields from data source mentioned in the schema and data related to the one or more output fields from a calculation code;

executing the plurality of intermediate calculations based on the data related to the one or more input fields to obtain calculated values of the one or more output fields;

comparing the calculated values of the one or more output fields with the retrieved data related to the one or more output fields to validate calculation code against the calculation specification; and displaying result of comparison for each of the one or more output fields as one of: (i) 'pass' if the calculated value of an output field among the one or more output fields is equal to retrieved data related to the output field and (ii) 'fail' if the calculated value of an output field among the one or more output fields is not equal to retrieved data related to the output field and highlighting the output field in the calculation specification to assist in debugging the calculation code.

* * * * *